United States Patent [19]

Nash et al.

[11] Patent Number: 4,926,633

[45] Date of Patent: May 22, 1990

[54] COOLANT PRESSURE REGULATING APPARATUS

[75] Inventors: Dudley O. Nash, Cincinnati; Frederick C. Herzner, Fairfield, both of Ohio

[73] Assignee: The United States of America as represented by the Secretary of the Air Force, Washington, D.C.

[21] Appl. No.: 372,416

[22] Filed: Jun. 27, 1989

[51] Int. Cl.⁵ .............................................. F02K 3/04
[52] U.S. Cl. ...................................... 60/226.1; 60/264; 181/220; 239/265.17
[58] Field of Search ................ 60/226.1, 226.3, 264, 60/262, 261; 181/220, 213, 259, 262; 239/127.3, 265.17

[56] References Cited

U.S. PATENT DOCUMENTS

| | | | |
|---|---|---|---|
| 2,925,072 | 2/1960 | Schmidt | 60/264 |
| 3,091,924 | 6/1963 | Wilder, Jr. | |
| 3,611,724 | 10/1971 | Kutney | 60/226.1 |
| 3,927,522 | 12/1975 | Bryce et al. | 181/220 |
| 4,165,609 | 8/1979 | Rudolph | 181/220 |
| 4,215,536 | 8/1980 | Rudolph | 181/213 |
| 4,355,507 | 10/1982 | Coffey et al. | 60/264 |
| 4,643,356 | 2/1987 | Holler et al. | |
| 4,742,961 | 5/1988 | Starke | |
| 4,813,229 | 3/1989 | Simmons | 60/226.3 |

*Primary Examiner*—Donald E. Stout
*Attorney, Agent, or Firm*—William Stepanishen; Donald J. Singer

[57] ABSTRACT

A coolant pressure regulating appartus having a predetermined number of coolant pressure regulating valves which rotate against a spring bias to divert coolant flow and excess pressure from the coolant air fan duct into the engine core exhaust flow. The pressure regulator valve regulates the pressure within a closed cavity suppressor to the pressure level within the core without any affect upon the upstream fan duct pressure.

8 Claims, 3 Drawing Sheets

4,926,633

COOLANT PRESSURE REGULATING APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a pressure regulating apparatus, and in particular to a coolant pressure regulating apparatus.

The state of the art of pressure regulating means is well represented and alleviated to some degree by the prior art apparatus and approaches which are contained in the following U.S. Patents:
U.S. Pat. No. 3,091,924 issued to Wilder, Jr. on June 4, 1963;
U.S. Pat. No. 4,643,356 issued to Holler et al on Feb. 17, 1987; and
U.S. Pat. No. 4,742,961 issued to
Starke on May 10, 1988.

The Wilder, Jr. patent is directed to a nozzle which includes a lining member that defines a throat. An array of perforations extend through the liner member both within and without a series of flaps. The flaps are arranged around the throat to be opened and closed to vary the porosity of the throat.

The Holler et al patent describes a gas turbine exhaust nozzle that includes a cooling liner for a convergent-divergent exhaust nozzle. The exhaust nozzle has a cooling liner which is strategically positioned in the nozzle to take advantage of aerodynamic conditions along the axial length of the nozzle.

The Starke patent discloses an exhaust gas nozzle which includes a cooling air diverter unit to direct cooling air to a reverser vane isolation valve during forward thrust operation, and to a conduit, which forms part of a reverser vane access passage, during reverse thrust operation. The cooling air diverter includes a pivotal arm assembly with inner and outer flaps that are independently movable about a first common hinge, and a floating flap which is pivotable about a second hinge fastened at the outward end of the inner flap.

The gas temperatures in the exhaust portion of turbojet and turbofan engines generally exceeds the limits of materials available for constructing the casings for the turbine frame, augmentor and exhaust nozzle and because of this, heat shielding liners are used inside the casings. It is necessary to cool these liners and, in turbofan engines, the coolant is core bypass or fan flow. The fan flow, after cooling the liners, passes through the exhaust nozzle along with the primary engine flow.

There are conditions under which the fan air which flows in the annulus between the liner and casing can be considerably higher in pressure than the core pressure thus resulting in inward or buckling loading. This loading can in turn, lead to the requirement for excessive structural weight and/or complexity in the design of structurally sound liners.

This excessive inward loading on exhaust liners exists on most turbofan engines. It is severe on all engines but particularly so on advanced technology engines wherein the engine depends, for its high performance, on sustained levels of fan pressure well in excess of the core engine pressure. This pressure level is often maintained by a controlled flow mixer which regulates the flow of fan air into the core stream.

On current production engines, the fan pressure normally exceeds the core engine pressure by a relatively small amount and excessive pressure loading conditions exist only transiently. The transient conditions are none the less severe however, and have resulted in buckling of liners in service. This is a current problem the solution of which threatens to add considerable weight to the liner design. These transient conditions are brought about by any condition which results in a large reduction of core pressure relative to the fan pressure. The conditions may be intentional such as the intentional opening of the exhaust nozzle on throttle chop during high speed flight as a means of maintaining engine flow or inadvertent conditions may exist such as augmentor flameout or an inadvertently opened exhaust nozzle.

On advanced high performance engines being developed for future aircraft, the excessive inward pressure imposed on the exhaust system liner from the turbine discharge all the way back to the nozzle flaps is of a much more severe nature. The transient pressure load condition, relative to current engines, is three or four fold greater but in addition high inward liner pressures exist in normal engine operation. This is brought about by two independent requirements. First, the fan flow pressure must be maintained significantly above the core pressure over much of the operating range in order to achieve maximum engine thrust, and secondly, high pressures result from necessary coolant conservation measures. Exhaust coolant flow must be strictly conserved in order to meet the performance demands of advanced engines and a key feature in the reduction of coolant flow is the replacement of the traditional perforated liner used for suppression of burner resonance with a closed cavity suppressor. Such closed cavity suppressor with greatly reduced open area conserves coolant by eliminating the coolant flow through the conventional liner perforations.

Elimination of the flow permeable perforations also, unfortunately, eliminates an effective means of venting and relieving excess liner pressure loading in event of a sudden, inadvertent drop in core pressure. This, in turn, means that in addition to the high normal operating liner pressure load, an even higher load will exist with a reduction in core pressure brought about by any of the conditions previously described.

Advanced engine exhaust liners with their coolant conserving closed cavity suppressors just do not have sufficient open area to vent fan flow into the core, limiting the pressure difference across the liner and thus the pressure load. Currently, liners are designed to tolerate both the intentionally sustained high pressure load and also the high peak pressure conditions resulting from inadvertent reduction in core pressure but this approach results in significant penalties in structural weight and/or complex, high cost, less maintainable liners contrived to tolerate extreme loading at reasonable weight.

The coolant pressure regulating apparatus has the greatest payoff on engines on which sustained fan flow pressure can far exceed core gas pressure. However, many turbofan engines have transiently exhibited excessive fan pressure and therefore could benefit from the present coolant pressure regulating apparatus. A means is needed to greatly reduce the liner pressure loading while maintaining fan pressure level as required for high performance and also conserving exhaust system coolant flow. The present invention is intended to satisfy that need.

SUMMARY OF THE INVENTION

The present invention utilizes a coolant pressure regulator for the regulation and reduction of excess pressure in an engine by-pass flow that is used for cooling exhaust system liners or heat shields of a turbojet/turbofan engine. In high performance engines using a closed cavity suppressor for conservation of coolant rather than the traditional perforated liner, the pressure within the suppressor which normally will exceed the pressure within the core, albeit by a small amount, becomes more pronounced with any sudden drop in core pressure thereby to place the liner under a load condition. A plurality of valves within and around the annulus of the cooling liner of the suppressor regulate the pressure within the suppressor to the level of pressure within the core without any effect in the upstream fan duct pressure. The pressure which acts upon the valves rotates the valve plates about an axis against a spring bias to open communication between the core and suppressor and to affect an adjustable blockage in the flow path along the fan duct to maintain pressure within the duct.

It is one object of the present invention, therefore, to provide an improved coolant pressure regulator apparatus.

It is another object of the present invention to provide an improved coolant pressure regulator apparatus that operates a pressure relief valve which opens at excess pressure loading conditions reduces structural loading on engine duct liners thereby significantly reducing the structural weight.

It is still another object of the present invention to provide an improved coolant pressure regulator apparatus wherein pivoting spring-loaded relief valves with transverse axes provide a fan air flow restriction while maintaining pressure within the fan duct for performance enhancement and relieving it at all points downstream.

It is a further object of the present invention to provide an improved coolant pressure regulator apparatus wherein the fan air flow restricting mechanism also provides rapid venting of the liner pressure downstream of valves in event of an inadvertent drop in core gas pressure.

It is still another object of the present invention to provide an improved coolant pressure regulator apparatus wherein flutter of the spring-loaded valves is avoided by interlocking the shafts of the multiple valve array.

It is a further object of the present invention to provide an improved coolant pressure regulator apparatus wherein the location of the valves on the lower temperature outer surface of the closed cavity suppressor limits the valve temperature and thereby enhances life and reliability of the engine.

It is yet another object of the present invention to provide an improved coolant pressure regulator apparatus wherein excess coolant flow is injected into the core gas stream to increase thrust at many operating conditions.

It is still a further object of the present invention to provide an improved coolant pressure regulator apparatus wherein the valve springs and bearings are each retained by common fasteners which are a simple design of two rivets per valve to attach springs and to retain bearings.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
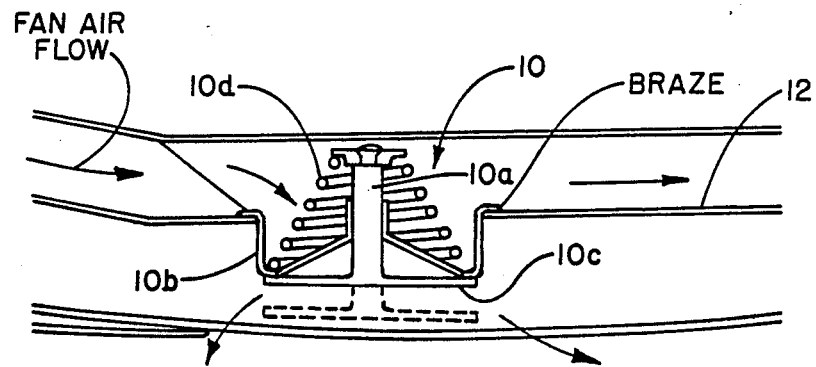
FIG. 1 is a schematic representation of a prior art exhaust liner pressure relief valve.

Referring now to FIG. 1, there is shown a schematic representation of a prior art exhaust liner pressure relief valve 10. The pressure relief valve 10 comprises a thermostatic core 10a which is mounted in a supporting housing 10b. The thermostatic core 10a includes a flow stopping plate 10c. A coil spring 10d is operatively positioned between the thermostatic core 10a and the supporting housing 10b to assist in the thermostatic action of the pressure relief valve 10. Spring-loaded pressure relief valves are generally in common use wherever compressed air or gas is involved. An early prior art attempt to apply this kind of valve as a means of relieving excess pressure load on exhaust system cooling liners was generally effective to cool and lower the pressure on the liner 12 but did not maintain the high pressure needed upstream of the valve. In operation the spring would compress allowing flow from the coolant annulus to enter the core gas stream thus relieving the pressure load on the liner. This conventional valve is typical of a number of spring-loaded valves that could be used.

The use of this type of valve compromised the effect of the controlled flow mixer which resulted in decreasing the fan duct pressure and thereby the engine thrust. It is very clear that there exists a need to reduce the liner pressure loading down stream of the mixer without adversely affecting the controlled fan and core flow mixing function.

Figure 2:
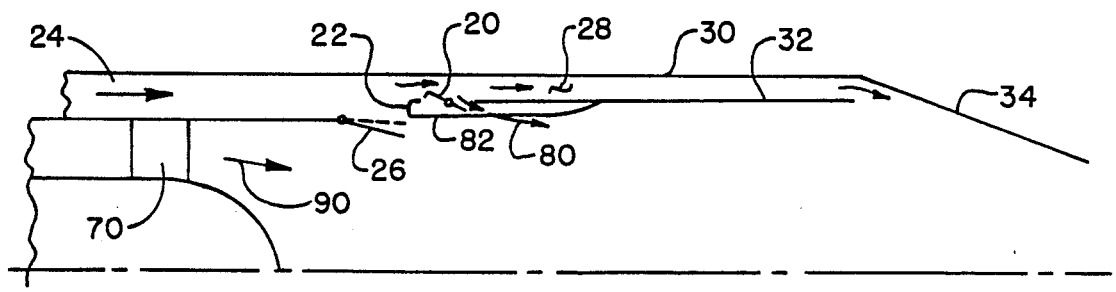
FIG. 2 is a schematic representation of the coolant pressure regulator apparatus according to the present invention.

Turning now to FIG. 2, there is shown a schematic representation of the coolant pressure regulator apparatus which is located in the exhaust system of a turbojet/turbofan engine. The pressure regulating valve 20 is positioned in the closed cavity suppressor unit 22. The closed cavity suppressor unit 22 is located at the far end of the forward fan duct 24 and after the mixer control unit 26. The pressure regulating valve 20 prevents the coolant pressure in the annulus 28 between engine exhaust casing 30 and liner 32 from becoming greater than that required for effective cooling of the liner 32 and the exhaust nozzle 34. This coolant pressure regulation is accomplished without affecting the pressure in the forward fan duct 24 which delivers fan air to the exhaust cooling annulus 28 and the fan/core flow mixer control unit 26. The benefit of limiting the coolant pressure is lower weight, lower cost and more easily maintained exhaust system liners.

Figure 3A:
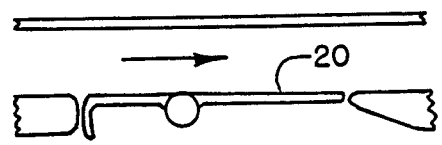
FIGS. 3a, b, c are schematic representations of the pressure regulating valve in different operational modes.
Figure 3B:
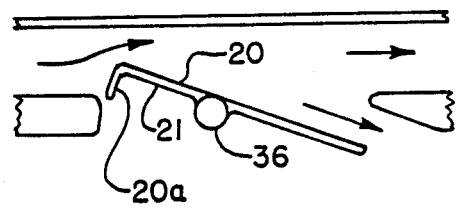
Figure 3C:
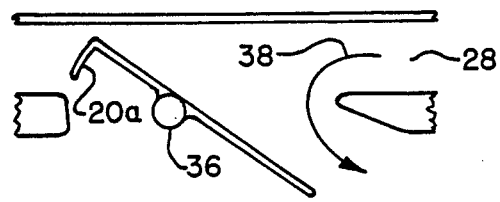

In FIGS. 3a, b c there is shown a schematic representation of the pressure regulating valve in different operational modes. In FIG. 3a, the forward fan duct is operating at low coolant pressure. In FIG. 3b, the operational mode is in the excess coolant pressure operating condition. In FIG. 3c, the operational mode is in a transient low core pressure mode. It should be well understood that while the present discussion is with respect to a single valve 20 that in actual operation a series of valves are arranged around the circumference of the liner 32. The following description of the operation of the pressure regulating valve 20 will be with respect to the operational modes that are shown in FIG. 3a, b, c and FIG. 2.

In operation shown in FIG. 3a, a series of valves 20 which are arranged circumferentially on the liner 32 are closed at low fan pressure operating conditions by springs 40 (shown in FIG. 4a) thus assuring adequate pressure for cooling. In FIG. 3b, as the fan flow pressure increases above the required coolant pressure, the valves 20 open by rotating about shafts 36. In typical spring-loaded regulating valve action, the higher the coolant pressure, the greater the force on the valve, which results in greater deflection of the springs and valve rotation and thereby a greater valve open area for relief of the excess pressure conditions. As the valve rotates to increase its pressure relieving area, the upstream portion of the valve 20 rotates into the flow annulus thereby providing a flow restriction which serves to maintain the fan duct pressure upstream as required for high engine performance. The flow restriction which is achieved by providing an L-shaped section 20a at the leading edge of valve 20, maintains the pressure at the mixer control unit 26 and also minimizes the size of the regulating valve 20.

In addition to the regulating function which limits coolant pressure under all operating conditions, the valve 20 can, in event of a sudden drop in pressure of the engine core flow, rotate additionally, as shown in FIG. 3d to provide additional area for rapidly discharging air 38 from annulus 28 into the core stream. This action reduces the high pressure loading which would otherwise exist under an inadvertently opened exhaust nozzle or other condition resulting in a large drop in core flow pressure.

Figure 5:
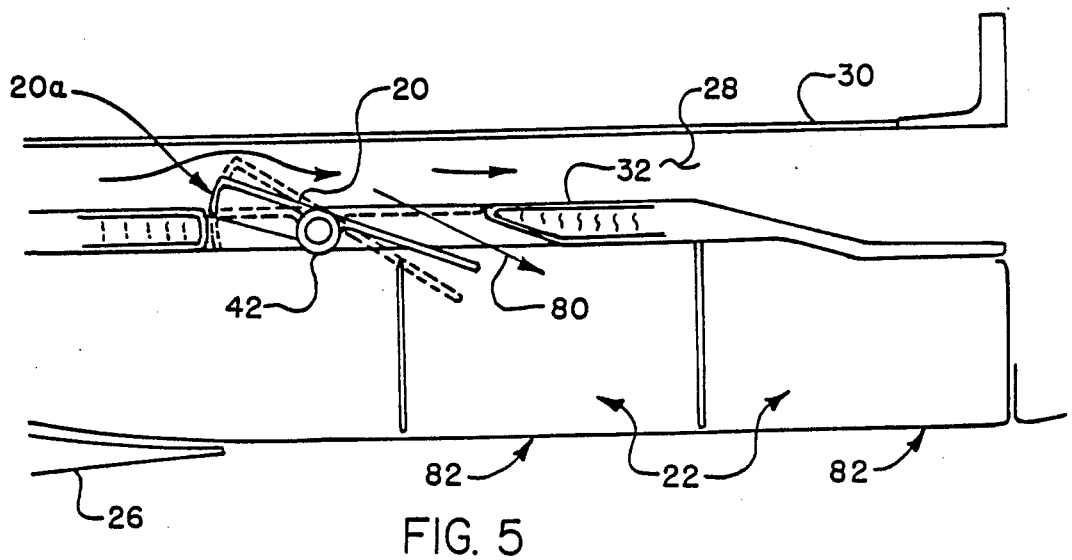
FIG. 5 is a schematic representation of the suppressor cavity and the coolant pressure regulator illustrating in greater detail the relationships therebetween.

The pressure regulating valves 20 can be located at a variety of positions along the flow path downstream of the turbine. The greatest benefit in structural weight saving is realized by positioning the valves at the turbine frame 70 just downstream of the turbine, since weight and cost would, in this way, be saved in all of the exhaust system liners. In applications, where fan duct pressure must be maintained rearward to mixer unit 26, the valves 20 may be located immediately downstream of the mixer as shown in FIG. 2. This result is less weight reduction but still substantial weight benefits are achieved.

Where a closed cavity burner resonance suppressor unit 22 is used, as shown in FIGS. 2 and 5, it is convenient to locate the valves on the suppressor. In this configuration, the valves are remote from the hot core gas flow and, in addition, the unavoidable leakage of the valves when closed will serve to provide some of the air flow into the suppressor cavity 22 which is necessary to purge any combustible fuel-air mixture from the cavity. The flow entering the core stream 80 readily passes through the perforated wall 82 of the suppressor unit 22. In addition to the weight and cost benefits provided by these coolant pressure regulating valves, there is a performance benefit. During all operating conditions where coolant pressure and flow is greater than that required for cooling of the exhaust liners the valves inject the excess coolant flow into the engine core stream. This added core stream flow may enter the augmentor combustion process and increase the engine thrust. By comparison, the excess coolant flow, if directed through the cooling circuitry downstream, will be subjected to severe turbulence and pressure degradation and will produce essentially no thrust as it is discharged at the aft end of the exhaust nozzle flaps.

Additional aspects of the coolant pressure regulating valve are described in the following paragraphs. Aeromechanical or flutter avoidance may also be achieved. The flow restricting L-shaped section 20a of the pressure regulating valve 20 provides a cap which serves two purposes. It prevents air upstream of the restriction from flowing through the valve opening and it also prevents dynamic pressure of the high velocity fan stream from acting on under surface 21 (FIG. 3b) of the valve portion 20. Without the L-shaped cap 20a, the dynamic pressure of the flow would affect valve forces and area, and thus would adversely affect the pressure regulation function. In addition, the valve without the L-shaped cap 20 would likely be prone to dynamic instability and flutter due to local fluctuation in flow at the upstream end of the valve 20.

Figure 4A:
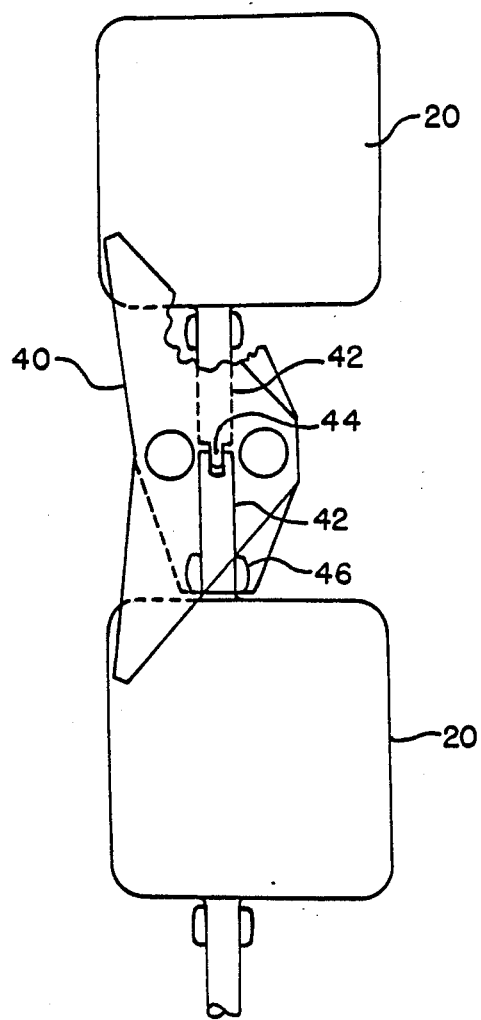
FIGS. 4a, b are plan and side views respectively of the pressure relief valve.
Figure 4B:
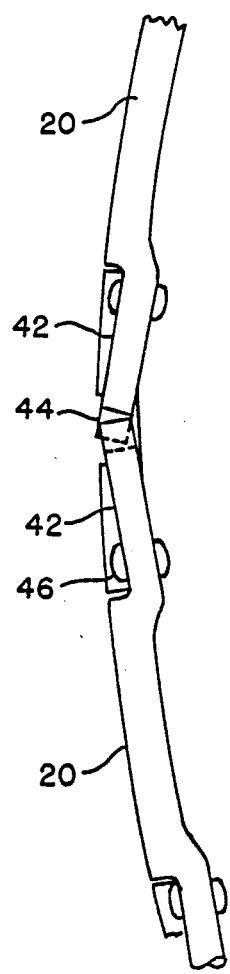

Since vibration is always a concern in the design of a spring-loaded air flow valves and as additional assurance of valve stability, the circumferential arrangement of valves, two of which are shown on FIGS. 4a, b, are inconnected to prevent oscillation of individual valves. This is accomplished by engagement of shafts 42 by tongue and groove mechanism 44.

In order to assure accuracy in pressure regulation, relaxation resistant springs 40 are used and bearings are designed to assure low, consistent valve friction. The use of self aligning spherical bearings 46 assures against friction variation due to binding in the bearings and the use of carbon bearings minimizes change of friction with life since no scoring of the bearing surfaces, characteristic of unlubricated metal bearings, can exist with carbon bearings.

The operation of the pressure regulating valve apparatus must be reliable. The valves must return to closed position under conditions of low cooling flow to assure adequate cooling. The valves also must not jam in the closed position. The carbon bearings assure non seizing, low friction operation at all times. In addition, the springs should be constructed from a durable, non brittle material so that failure of a spring is highly unlikely. There could also be four springs on each valve so that the effect would be small should a spring fracture.

Although the invention has been described with reference to a particular embodiment, it will be understood to those skilled in the art that the invention is capable of a variety of alternative embodiments within the spirit and scope of the appended claims.

The pressure regulating valve described here is applicable broadly in the reduction of excess pressure in engine bypass flow used for cooling exhaust system liners or heat shields. The weight, cost and maintainability advantages will vary with the application. The alternative applications include:

a. use with or without controlled fan/core flow mixer, b. location on turbine frame or augmentor, and c. location on closed cavity suppressor or directly on the flow path wall.

These are just a few of the possible alternative applications that have cited illustrative examples.

What is claimed is:

1. A coolant pressure regulating apparatus in the exhaust system of an aircraft turbine engine comprising in combination:

an engine casing enclosing a turbine and extending downstream therefrom to an exhaust nozzle, said engine casing between said turbine and said exhaust nozzle enclosing a fan duct which operatively communicates with said turbine and said exhaust nozzle, said fan duct located inside the outer periphery of said engine casing and enclosing a core air flow channel, said core air flow channel directing air from said turbine to said exhaust nozzle, a closed cavity suppressor operatively arranged along the inner surface of said fan-duct, said closed cavity suppressor having an upper and lower wall, said closed cavity suppressor operatively communicating the coolant air flow from said fan duct into said core air flow channel, and, a predetermined number of valves circumferentially arranged in said upper wall of said closed cavity suppressor, each valve of said predetermined number of valves being responsive to the level of pressure of the coolant air in said fan duct, said valve being in the closed position during low coolant air pressure thereby preventing coolant air flow from said fan duct from passing into said closed cavity suppressor, during an excess coolant air pressure operating condition said valve opens to relieve the excess coolant air pressure operating condition and thereby maintaining a desired coolant air pressure in said fan duct.

2. A coolant pressure regulating apparatus as described in claim 1 wherein said valve includes an L-shaped section at the leading edge of said valve to provide flow restriction to the coolant air flow from said fan duct thereby maintaining the desired coolant air pressure within said fan duct.

3. A coolant pressure regulating apparatus as described in claim 1 wherein said closed cavity suppressor comprises a plurality of closed cavity segments operatively arranged around the inner surface of said fan duct.

4. A coolant pressure regulating apparatus as described in claim 1 wherein said lower wall of said closed cavity suppressor is perforated with a predetermined number of holes to pass coolant air flow into said core air flow channel.

5. A coolant pressure regulating apparatus as described in claim 1 wherein each valve of said predetermined number of valves are respectively mounted on interlocking shafts.

6. A coolant pressure regulating apparatus as described in claim 1 wherein adjacent valve pairs of said predetermined number of valves include respectively a spring between adjacent valve pairs.

7. A coolant pressure regulating apparatus as described in claim 5 wherein the respective ends of said interlocking shafts are respectively tongue and grooved, said tongue and grooved ends of said interlocking shafts being fastened by self-aligning spherical bearings.

8. A coolant pressure regulating apparatus as described in claim 6 wherein said spring comprising a relaxation resistant spring which has a substantially triangular shape.

* * * * *